R. H. WATSON.
Gas Fixtures for Lighting Vaults.
No. 163,035. Patented May 11, 1875.
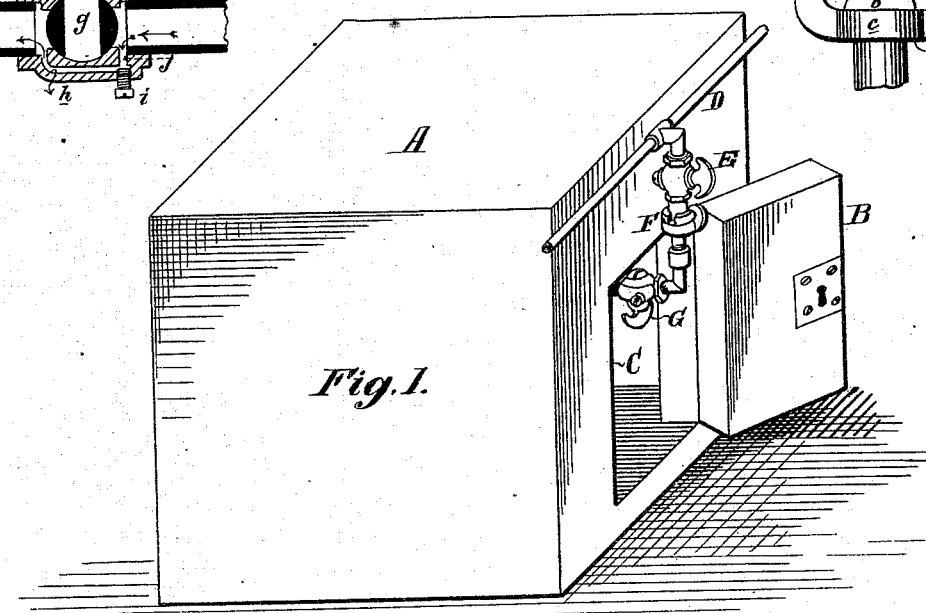
Witnesses: W. P. Hibberd, Oliver E. Woods
Inventor: Richard H. Watson

UNITED STATES PATENT OFFICE.

RICHARD H. WATSON, OF PHILADELPHIA, PENNSYLVANIA.

IMPROVEMENT IN GAS-FIXTURES FOR LIGHTING VAULTS.

Specification forming part of Letters Patent No. 163,035, dated May 11, 1875; application filed April 15, 1875.

*To all whom it may concern:*

Be it known that I, RICHARD HARTMAN WATSON, of the city and county of Philadelphia, and State of Pennsylvania, have invented Improvements in Gas-Fixtures for Lighting Vaults, of which the following is a specification:

The general object of my invention is to improve gas-fixtures for lighting bank and other vaults, by providing facilities for bringing into use, in a convenient form, metallic detachable gas-pipes, (in place of rubber tubing now commonly used,) for connecting the inside gas-pipes of bank-vaults with outside pipes of supply; also, in combination with the detachable connecting-pipes, such instrumental conveniences and safeguards as I have found to be desirable in using the said pipes, as well as in detaching and reconnecting them—providing for regulating the flow of gas to the burners inside the vault by independent and yet controllable maximum and minimum passages.

It is, of course, understood that the possibility of introducing gas into a bank-vault with its door closed must be excluded wholly, and that when the door is to be closed the pipe-connections with gas-supply must be severed, and the detachable part of the pipe turned out of the way of the door, either inside or outside of the door, as may be preferred.

I have aimed to perfect and combine for use, in the most convenient manner, all needed instrumentalities for the general object before named, of improving gas-fixtures for lighting vaults—first, by dispensing altogether with rubber tubing, and thus avoiding the unpleasant odor it gives in the room where it is used for gas; and, second, by a manual coupling of great simplicity and efficiency at one end of a metallic detachable connecting-pipe, which, in combination with a swing-joint at the opposite terminus of the said pipe, affords ready and perfect means of establishing or breaking, as the case may be, the connection through which gas-supply flows from the outside supply-pipe to the pipes and burners within the vault; and, third, by supplying the detachable pipe with a cock, around one side of which a small passage for gas is provided and placed under the control of a regulating-screw, so that it can be set to any desired feed, the special object being to prevent extinguishing the light at the burners by accident in turning the cock which controls the maximum passage, when the vault full-lighted is not required.

The drawings herewith presented show an ordinary bank-vault with inside gas pipes and burners, and an outside supply-pipe connected by detachable metallic gas-fixtures containing my invention.

Figure 1 is a perspective view of a vault and gas-fixtures combined, all in their normal condition for use in lighting the vault. Fig. 2 is a vertical transverse section of the same. Fig. 3 is an enlarged view of the cock G; Fig. 4, an enlarged view of the coupling F.

A, the vault; B, the door; C, the doorway; D, the supply-pipe; E, main cock, controlling the supply to the detachable pipe; F, manual coupling; G, main cock in the detachable pipe, controlling the maximum passage to the burners within the vault. H and I are swinging joints in the detachable pipes. Dotted lines show the position of the pipe when detached and swung into the vault. Should it be desired to swing it outwardly, the swinging joints and coupling would be reversed. K, inside pipe; L, burner.

The manual coupling F is so clearly shown in the drawings as to need but little explanation—in external shape much like a thumb-nut. It revolves loosely upon the detachable pipe, which it clamps tightly to the supply-pipe.

$f\ f$ are inclined ways upon the supply-pipe, with spaces between them, through which the inwardly-turned points of F $a\ a$ are passed up to travel upon them, while C moves freely under the head of the pipe upon which it is placed, and thus $b$ is raised home to its seat, and a tight and firm joint is thus completed.

The cock G, with maximum passage $g$, and the minimum passage around one side of it, $h$ and $j$, under the control of the regulating-screw $i$, is also plainly shown. The screw $i$ is set so as to feed sufficient gas to the burners to sustain a flame at all times when the ...ed and the gas turned on—... cannot be so turned, accidentally or otherwise, as to extinguish the light.

When the lights are to be wholly extinguished it is done by turning E; then uncouple the detachable pipe, and swing it around as shown in dotted lines, and the vault-door may be closed and secured.

I claim—

The metallic detachable gas-pipe, provided with the manual coupling F and swinging joints I and H, as herein shown, in combination with the supply-pipes K and D, as and for the purpose herein set forth.

RICHARD H. WATSON.

Witnesses:
 WM. P. HIBBERD,
 OLIVER E. WOODS.